United States Patent [19]

Wainer

[11] 4,073,989

[45] Feb. 14, 1978

[54] CONTINUOUS CHANNEL ELECTRON BEAM MULTIPLIER

[75] Inventor: Eugene Wainer, Shaker Heights, Ohio

[73] Assignee: Horizons Incorporated, Cleveland, Ohio

[21] Appl. No.: 338,363

[22] Filed: Jan. 17, 1964

[51] Int. Cl.[2] .................................................. B32B 3/04

[52] U.S. Cl. .............................. 428/131; 313/105 CM

[58] Field of Search .................... 264/43, 61; 250/213, 250/8.6, 218, 213 VT; 313/103, 89, 90, 91, 92, 94, 103, 108, 105 CM; 161/109; 252/500, 507, 520, 521; 178/6; 117/221; 346/74; 315/169 TV; 428/131

[56] References Cited

U.S. PATENT DOCUMENTS

| | | | |
|---|---|---|---|
| 2,007,053 | 7/1935 | Hawe | 264/43 |
| 2,015,570 | 9/1935 | Sabbah | 313/89 |
| 2,399,313 | 4/1946 | Ballard | 264/61 |
| 2,821,637 | 1/1958 | Roberts | 250/213 |
| 2,879,420 | 3/1959 | Hares | 313/68 |
| 2,962,452 | 11/1960 | Count | 252/520 |
| 3,002,841 | 10/1961 | Goodman | 252/507 |
| 3,015,747 | 1/1962 | Rosenberg | 313/108 |
| 3,030,514 | 4/1962 | Salinger | 250/313 |
| 3,062,962 | 11/1962 | McGee | 250/213 |
| 3,128,408 | 4/1964 | Goodrich | 250/207 |

*Primary Examiner*—T.H. Tubbesing
*Assistant Examiner*—T. M. Blum
*Attorney, Agent, or Firm*—Lawrence I. Field

EXEMPLARY CLAIM

1. A fully vitrified ceramic element comprising a thin wafer having at least one aperture extending through said wafer, and perpendicular to the major surfaces of said wafer, the composition of said wafer consisting essentially of between 10 and 50 mole percent of at least one oxide selected from the group consisting of the oxides of Cs, Rb, K, Be, Mg, Ca, Ba, Sr, Ce, La, Yt and Zn, and between 90 and 40 mole percent of oxide of a metal selected from the group consisting of titanium, tin and niobium and between 0.5 and 3 mole percent of an oxide forming compound of at least one element selected from the group consisting of Ag, Au, Pd, Mo, W, and Sb.

6 Claims, 6 Drawing Figures

INVENTOR

Eugene Wainer

BY Lawrence I Field

ATTORNEY

CONTINUOUS CHANNEL ELECTRON BEAM MULTIPLIER

This invention relates to a vitrified ceramic plate composed of specified materials, processed in a specific manner and to the utilization of such plates in image presenting devices. More specifically it refers to continuous channel electron beam multiplier plates and to devices in which such plates may be used.

As the resolving power of a photographic film is improved, its photographic speed is reduced proportionally to the point where with normal glass optics and the usual camera devices exceptionally high levels of illumination are quite often required to produce a desired result. Thus, in order to take advantage of otherwise suitable photographic film from the standpoint of resolution and which are unsuitable from the standpoint of photographic speed, a method for amplifying low levels of light normally striking the surface of such film would be highly desirable so that the limiting factor of insufficient photographic speed can be removed.

It is a primary object of this invention to provide an image intensifier based on a novel continuous channel device producing brightness increases or current amplifications of the order of a million or more at resolutions in the range of 100 to 1,000 lines per mm. In effect therefore, the novel device and combinations of materials defines a camera in which an optical image of low brightness can be utilized to produce a high resolution image on a photographically slow high resolution surface.

It is a further object of this invention to provide an electron multiplier exhibiting current multiplications through the interaction of photons and electrons of the order of a million or more on a controlled basis. By virtue of the mechanics of electron multiplication, image intensification in the field of the visible, ultraviolet, infrared, x-rays and nuclear radiation may be performed.

The invention will be better understood from the following description and drawings in which.

Figure 1:
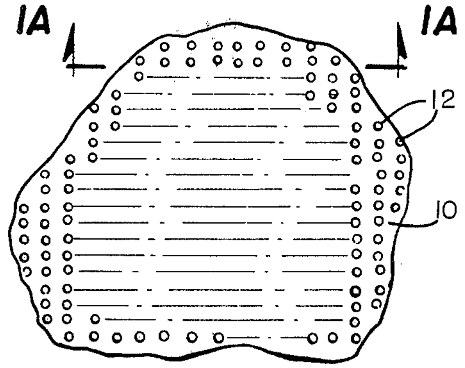
FIG. 1 is a perspective of a fragment on one form of vitrified ceramic plate according to the invention.
Figure 1A:
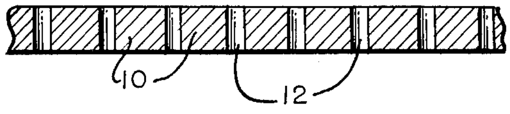
FIG. 1A is a view taken through plane 1—1 of FIG. 1.
Figure 2:
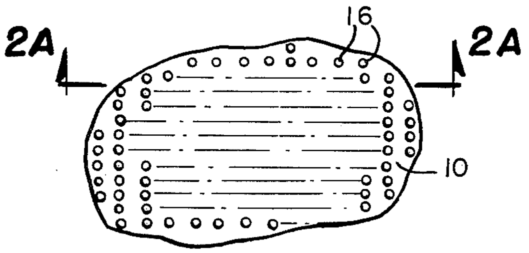
FIG. 2 is a perspective of a fragment of a second form of vitrified ceramic plate.
Figure 2A:
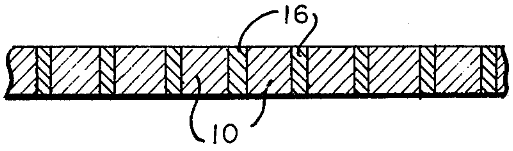
FIG. 2A is a section taken through plane 2—2 of FIG. 2.
Figure 3:
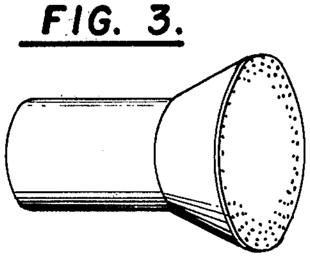
FIG. 3 is a schematic view of an image intensifier tube utilizing the plates of either FIG. 1 or FIG. 2.

The vitrified ceramic plate 10 shown in FIGS. 1 and 2 is composed of a ceramic composition in fully vitrified form which consists of at least two oxides usually with one or more modifiers. The plate contains at least one and preferably a very large number of holes 12 which are placed sufficiently close together in the wafer so that they constitute at least approximately one half or more of the exposed surface area of the wafer. The holes extend through the thickness of the plate and the sides of the holes are straight. Preferably the holes are at right angles to the plane of the plate. In FIGS. 1 and 1A the holes are hollow and in FIGS. 2 and 2A they are filled with a metallic conductor 16. The number of holes may be as high as several million when the device is to be utilized as a multichannel device, or only a single hole as in FIG. 2 when the device is to be used as a single channel device, e.g. for electron beam spot formation.

The vitrified ceramic plate of this invention is initially in the form of a wafer which may be square, round or other suitable shape and whose thickness is in the range of 50 to 150 times the diameter of the holes 12 extending through the wafer 10. The number and spacing of holes 12 is such that they comprise approximately 50% or more of the exposed surface area of said wafer and by suitable manufacturing techniques the holes are straight sided and are parallel to one another. In the wafer of FIG. 1 the holes are hollow and empty and in the wafer of FIG. 2 which is specifically suited for a particular method of recording photographic or electrical images the holes are filled with a metallic conductor. It is a further feature of this invention that the interior of the holes exhibit rectifier characteristics, this being a requirement for noise reduction purposes. The novel ceramic composition in fully vitrified form operates as a highly efficient secondary emitter of electrons. It may be utilized as a multichannel device containing several million holes so spaced that at least 50% of the exposed area is comprised of holes or a single hole may be used as a single channel device.

COMPOSITION

The novel ceramic secondary emitter in finished fired form is comprised of at least two oxides and may contain in addition thereto one or more modifiers for control of particle size during the sintering and for facilitating vitrification and one or more metals or the oxides of such metals for improving the secondary emission characteristics. A specific requirement for this ceramic is that the average particle size in the finished fired body does not exceed 0.5 microns and in order to achieve this result, the raw body from which the finished ceramic is produced is comprised of starting particles having sizes in the range of 100 A and not exceeding 300 A size.

The base composition contains at least 10 mole percent and up to 50 mole percent of oxides of various electropositive metals. The optimum content of these oxides in the composition is between 25 and 50 mole percent. The metals whose oxides are suitable for the purposes of this composition are cesium, rubidium, potassium, beryllium, magnesium, calcium, barium, strontium, cerium, lanthanum, yttrium and zinc. The composition may comprise the oxide of a single metal or of a plurality of said metals. For convenience in this description these oxides will be designated as A type oxides. The second portion of the composition comprises materials which can be made to combine chemically with the A type oxides by suitable heat treatment, and which also exhibit the highly important properties of being refractory, being capable of reduction to a fully electrically conducting state either alone or in combination with the A type oxides described previously by firing in specialized reducing atmospheres when necessary and which are also capable of being made as first class insulators when fired in a fully oxidizing atmosphere in combination with the A type oxides or when heated alone under suitable conditions. The materials meeting these qualifications are conveniently designated as B type oxides and are the oxides of certain elements in the 4th and 5th groups of the Periodic Table, namely: titanium, tin and niobium.

In the compositions of this invention, the range of useful mole percentages of the B type oxides are between 40 and 90 mole percent and best results are achieved in a composition range of 45 to 75 mole percent but the mole fraction of the A oxide never exceeds the mole fraction of the B oxide. Optimum results are obtained when the mole fractions of the A oxide portion of the composition and the B oxide portion of the composition are equal.

The composition may contain minor amounts of at least two other types of oxides and for convenience in this description these two other types of materials are designated as C and D type additives. In the case of AB compositions which the B portions contain significant percentages of titania or tin oxide an additive found useful for control of particle size in the firing operation is tantalum oxide. This is normally supplied to the composition in the form of its oxalate so as to provide a thorough dispersion of the material throughout the raw batch, such water soluble oxalate pyrolyzing to the oxide under the firing conditions to be described later. The primary purpose of this additive is the restriction of the growth of the grain size during the vitrification operation. In the case of those AB compositions which contain significant amounts of niobium oxide, the acetates of zirconia or hafnium or combinations of both serve to restrict the growth of the grain size during vitrification and again these materials pyrolize completely to the oxide under the firing conditions to be described later. When these additives are used for particle size control of the firing operation generally a minor amount of silica in a particle size range of 20 to 100 A is also added to aid in vitrification, and for convenience silica is included in the C oxide grouping.

In the pyrolized form, namely as complete oxides, the amount of the oxides of tantalum, zirconium or hafnium or combinations thereof utilized for the purposes of particle size control normally should not exceed 5 mole percent of the total composition and the presence of as little as 1 mole percent produces a significant effect. The mole fraction of the finely divided silica utilized for the promotion of vitrification is in a similar percentage range, namely between 1 and 5 mole percent of such additive.

Still another class of materials may be added in minor percentages to the composition for purposes of facilitation of secondary emission. This class of materials comprises compounds which yield oxides of metals selected from the group consisting of silver, gold, palladium, molybdenum, tungsten and antimony. These materials are added to the raw compositions in the form of their water soluble salts such as silver nitrate, ammonium molybdate or tungstate, the thiocyanates of gold or palladium or the complex ammonium tartrate of antimony. Computed on an oxide basis in the finished ceramic preferred percentages ranges for this latter group of additives are in the range of 0.5 to 3.0 mole percent. In certain cases their use is optional.

WAFER PREPARATION

The following example is intended to illustrate the preparation of the specialized ceramic constituting the wafer of FIGS. 1 and 2.

A dry powder exhibiting a range of particle sizes within the limits of 100 Angstrom units and 300 Angstrom units and consisting of 47.5 mole percent barium oxide, 47.5 mole percent titanium dioxide, 2.5 mole percent tantalum dioxide and 2.5 mole percent silicon dioxide is prepared initially by utilizing metallo-organic derivatives of the first three named materials in a manner similar to that described in Wainer U.S. Pat. No. 2,948,628 issued Aug. 9, 1960. These may be produced in wet form by coprecipitation using controlled hydrolysis, or the mixed metallo-organic starting materials in dry form may be subjected to pyrolysis in air at temperatures not exceeding 1200° F. The silica is normally added to the composition as a colloidal sol commercially designated either as Nalcoag or Ludox in which substantially pure silica in 50% concentrations is available as a water dispersed sol in which the individual particle sizes of the silica micelles are of the order of 20 Angstrom units.

After admixture of 10% by weight of distilled water, this combination of raw materials in fully oxidized form and in the particle size range indicated previously is pressed to produce the desired shape, pressures in the range of 4000 to 10,000 psi being utilized for this purpose. The green sample is dried in an oven at 125° C and then placed in a furnace wherein it is heated to a temperature of 750° C over a period of 2 hours maintaining the sample at this higher temperature for ½ hour.

If the sample is removed from the furnace, allowed to cool and then examined it is found that substantially no shrinkage of the specimen has taken place and the average particle size of the composite is a range of 200 to 300 Angstrom units. Sufficient sintering has developed at this stage so that the wafer possesses sufficient mechanical strength to be handled easily. The composition just described will normally achieve full vitrification to maximum density on firing in an oxidizing atmosphere and at a temperature of 1,455° C.

To continue the description of the technique of firing, the specimen is removed from the uniformly heated furnace maintained at 750° C in air and placed immediately in another furnace maintained at 1150° C in air and retained therein for 10 minutes. At the end of this period the specimen is again removed and immediately placed in a furnace maintained at 1455° C but utilizing a flowing atmosphere containing approximately 99% hydrogen and 1% water vapor being fed to the furnace at the rate of 1 cubic foot of gas per minute. Access to such furnace is through a flame curtain. The specimen is maintained at the temperature of 1455° C and the modified hydrogen atmosphere for a time period of at least 30 minutes after which it is pushed to a zone in the furnace outside of the heated area where it is allowed to cool to room temperature in the hydrogen atmosphere.

HOLE PIERCING

The solid specimen so produced is ready for the hole piercing stage, when hole piercing is to be accomplished by a combined chemical electrolytic milling technique.

This technique involves forming the holes by electrolytic etching through a photoresist in which the electrically conductive ceramic is utilized as the anode and material is removed by the electrolytic action in a suitable electrolyte only in those places where the photoetch has been removed. By this approach a hole pattern up to the order of 1000 lines per mm mechanical resolution can be achieved and its advantage is that the method is not size limited so that a large area can be as readily etched by the procedure as a small area.

A fully reduced slab of the vitrified electrically conducting ceramic prepared by firing in hydrogen and as described previously is next covered completely on all surfaces with a photoresist, the thickness of the dried photoresist not exceeding 0.3 mils in thickness. A variety of photoresist compositions are suitable for the purpose. Among these are the polyvinylcinnamate composition designated as KPR and manufactured by The Eastman Kodak Company. This photoresist is made insoluble in organic solvents, acids and alkalis by exposure to ultraviolet light and is developed very simply by washing after exposure with a mixture of toluene and methyl ethyl ketone. It is most conveniently applied as a 10% solution of the polymer. A second variety is based on a nylon photopolymer. This is made by dissolving a mixture of 19 grams of nylon 808, 1.8 grams of methylene bisacrylamide, and 1.0 grams of benzophenone in a mixture of 105 grams of absolute ethyl alcohol, 27 grams of distilled water and 6 grams of dimethylformamide. This mixture is made under a yellow safe light. This material is used to coat the specimen as before utilizing an atmosphere of nitrogen for the purpose during the drying step. After suitable exposure to a collimated ultraviolet beam the film is dried at 200° F for 10 minutes to eliminate residual solvent. The resist is developed with a stirred solution of 4 grams of calcium chloride per liter of 9 to 1 by weight of a methanol-water solution. In the case of the nylon photopolymer, film thicknesses of the order of 1 mil may be utilized and development time requires 1 to 3 minutes to completely etch out the unexposed portions. Other resists suitable for the purpose are combinations of N-vinyl carbazole, carbon tetrabromide, polystyrene and hydrocarbon wax dissolved in tetrahydrofuran and benzene and developed in benzene after exposure of the dry film to a suitable source of ultraviolet light as described in Wainer U.S. Pat. No. 3,046,125 issued July 24, 1962. While all of these photoresists are suitable for the purpose the KPR type appears to be most convenient because of its unusual resistance to a wide variety of solvents which make the subsequent operations simpler.

The first step in the technique after the application of the photoresist to the specimen is the development of absolute registry between two photomasks of the same size placed emulsion to emulsion. Two suitable photomasks are produced by photographic reduction utilizing lithographic film having an emulsion thickness of approximately 3 microns on a dimensionally stable base such as Cronar or Estar. With such film and with precision lithographic and reduction cameras, dot patterns of uniform distribution showing a resolution of at least 1000 lines per mm are readily achieved. In order to produce the best results for subsequent operation the dot pattern which is black against transparent background should have a photographic density of at least 3.0. The two masks are moved relative to each other on a photographic viewing table until all indication of a Moire pattern disappears. In a uniform dot pattern the presence or absence of such a Moire pattern defines a degree of superimposition of one black dot over another with an accuracy greater than 1 part per million dimensionally. While the two masks are thus held together in registry by the forefinger pressed tightly in the center portion, opposing corners of these superimposing masks are stitched together with a front end single punch metal stitching machine. Thereafter it is removed to a smooth surface block of soft wood such as pine and pins maintained perpendicularly are punched through each of the corners into the wood thus holding the superimposed mask in registry. After this step the corners containing the metal stitching are cut off to remove such stitching leaving the two masks free to move relative to each other perpendicularly without change in registry. Utilizing yellow light darkroom illumination the ceramic specimen, previously coated with the photoresist is now slid between the two masks which are still retained on the pins after which the pins are driven into the wood so that their heads are flush with the surface of the top mask. A ⅛ inch thickness of polished pyrex glass is placed on top the mask to hold it in close contact with the surface and the assembly is then given a suitable exposure to ultraviolet light which has been collimated to retain resolution. After the exposure on one side is completed the assembly with the pins still in place is removed from the wooden base and the pins are now reversed one at a time so as to continue to maintain resolution not only between the two shadow masks but also relative to the ceramic plate in between. Following this procedure the reverse side is then exposed as before. This then yields a ceramic with a dot pattern accurately positioned on both sides of the specimen so that an exposed area on one side is exactly superimposed on an exposed area on another. While the technique just described is one means for obtaining a full resolution duplication on both sides of the ceramics a number of other techniques known to those skilled in the art may also be utilized for the same purpose. For example, instead of using the double photomask procedure just described a micrometer adjustment on a two-way optical bench is also suitable.

In the case of the KPR type of photoresist and utilizing a 275 watt General Electric Sunlamp as the source of ultraviolet light at a distance of 9 feet in order to insure good collimation in a light tunnel, an exposure time of about 30 minutes is required for completion of this portion of the operation. Noonday sun may also be utilized with good results and under these conditions an exposure time of about 3 minutes is sufficient to complete the operation.

After exposure is complete the assembly with its photoresist is heated in the dark in an oven at 200° F for about 10 minutes to remove all traces of residual solvent in the photoresist and is then developed in a mixture of toluene and methyl ethyl ketone for a period of 3 minutes agitating the solution gently during the development procedure. In this case the specimen is stood on edge so that both sides develop uniformly. The uniform dot pattern produced as a consequence of the procedure described is readily visible under the microscope. Thereafter, one side of the thus exposed photoresist pattern containing ceramic is painted with a room temperature lacquer bonded silver paint (duPont) to a thickness of 3 or 4 mils. While the lacquer is still damp a shim of copper ¼ inch in width and 4 inches in length is attached to the silver lacquer surface simply by pressure and silver paint lapped over such copper shim to hold it in place. The ¼ inch width copper shim made of 5 mil copper foil extends several inches beyond the edge of the specimen. The assembly is then placed in an oven and baked at 250° for 10 minutes to set the lacquer. Using a spray can and with proper masking devices a methyl methacrylate lacquer is then applied over the entire back of the specimen, completely covering the silver, over the edges of the specimen, lapping around the edges to leave a ⅛ inch border of lacquer covered surface on the front nonsilver side and the copper connector is coated for about half its length above the specimen. The methyl methacrylate lacquer is then baked for drying.

As a result a specimen having a dot pattern photoresist on both sides the back of which is connected electrically to the specimen through the medium of painted silver electrode and the silver electrode and the edges of the specimen and the copper connected thereto is fully insulated, electrically speaking, by the coating of methacrylate lacquer indicated has been produced. After all the lacquer coatings are completely cured the specimen is then made an anode in electrolytic cell. In the case of barium titanate a suitable electrolyte is 10% hydrochloric acid by weight. The cathode is a graphite slab which has roughly the same size and shape as the anode and the connection to the cathode is made through the medium of a graphite dowel pin. The assembly is placed in a water bath in order to maintain the temperature of electrolysis at not more than 50° C. Electrolysis is carried out at voltages between 25 and 75 volts D.C. In view of the formation of barium and titanium chlorides in the solution as electrolysis continues, the hydrochloric acid electrolyte is replenished periodically so as to maintain an HCl concentration in the range of 8 to 10 percent. Under these conditions and using current sources based on selenium rectifiers capable of producing current densities in the region of 10 to 20 amperes per square centimeter at the anode surface, electrolysis is complete in about 30 minutes.

After the completion of this operation the specimen is soaked in a mixture of methyl ethyl ketone and ethyl acetate and by use of cotton swabs, the methyl methacrylate lacquer and the lacquer silver paint is thus removed, after which the specimen is washed through the holes produced by electrolysis with high pressure water and which is eventually removed by first soaking in alcohol and drying with compressed air. Examination of the specimen shows that a multi-channel device duplicating the dot pattern on the photomasks is now available. These holes duplicate the diameter of the dots in the original shadow masks and have relatively straight walls through the specimen. The residual photoresist is removed by heating the specimen in hydrogen to about 600° F for a few minutes which pyrolyzes and distills off all organic material without decomposition of the base specimen.

Thus from the procedures described in the foregoing a multi-channel plate exhibiting resolutions up to 1000 lines per mm may be made by electrochemical etching. As a result of the method of firing the material is in a completely electrically conducting state. In order to make the materials suitable for electron multiplication purposes where the interior of the channels themselves act as amplifiers through the medium of secondary emission a specialized atmosphere heat treatment is now required. In the fully oxidized form, compositions of the type described in the specification will generally exhibit a resistivity of the order of $10^{14}$ ohm-centimeters. For the purposes of this invention the volume resistivity of the material should be in a range of $10^8$ to $10^{11}$ ohm-centimeters. This resistivity is readily achieved by firing the specimen in air first at 600° C for a period of 1 hour followed by a heat treatment at 800° C for about $\propto$20 minutes. In view of the vacancies which have been produced in the crystal structure as a consequence of the heat treatment, oxidation in the desired sense takes place by diffusion. A body and surface produced in this manner exhibits rectifying characteristics and the existence of this rectification property is of significance in the performance of the tube as will be shown later.

We now have a specimen consisting of a plate whose surface area is substantially at least 50% hole area exhibiting a volume resistivity on the order of $10^8$ to $10^{11}$ ohm-centimeters. To establish the effectiveness of this device as an electron multiplier, gold is evaporated at a 45° angle on one surface of the plate to a thickness yielding a purplish cast indicating that it has a ¼ wave thickness with respect to red light, namely in the region of 0.1 to 0.2 microns in thickness. A somewhat thicker layer is again evaporated at a 45° angle on the opposing side. The purplish cast gold acts as a photocathode and is a primary emitter of electrons in the ultraviolet. A potential difference varying between 0.5 and 10 kilovolts may be applied across the specimen. The specimen is sealed into a vacuum chamber so constructed that the front photocathode surface of the channel device can be exposed to a 2537 A lamp available from a high pressure mercury lamp with a quartz envelope. Quartz optics are used for the purposes of focusing. A potential difference is established between the front and back surfaces of the channel device. A flat glass plate constituting the exit closure contains a coating of a zinc sulfide cadmium sulfide phosphor on the vacuum side. Measuring light intensities from ingress to exit of this device indicates that under steady state conditions an amplification factor with respect to thickness in the range of 500 to 1000 is achieved in a single stage in the case where the ratio of length to diameter of the holes are approximately 65 to 1. By placing a collector electrode at the exit end of a channel in place of a phosphor plate and calibrating the current equivalent of the light source impinging on the surface it is established that the current amplification also exhibits an equivalent multiplication factor.

The electron source utilized with the device prepared as above described, may be a photocathode of metallic or complex nature, such as cesium silver oxide or cesium silver antimony oxide for response in the visible or may be gold or silver antimony for response in the ultraviolet and violet.

These channels have also been used in tandem in which electrons coming from the first set of channels after amplification strike an exactly similar type of channel in a second stage etc. The increase in brightness of current amplification is simply a multiplication of the individual amplification factors of each channel. If the multiplication factor for a particular channel is 1000 then the end result is an amplification of 1 million. The photocathodic property on the front face of the second and successive channels has been found not to be an absolute necessity and the inference is that the photocathodic surface when based on a metal such as gold simply provides a means for making an electrical connection for that particular stage of the channel. The original electrons representing the initiation of the energy conversion process may come from a photocathode, an electron gun, a radioactive source, such as strontium 90 or cobalt 60, or may be simply a vacuum grid tube in which the tungsten filament is used as the electron source and the front surface of the first channel is the collector electrode from the grid.

Figure 4:
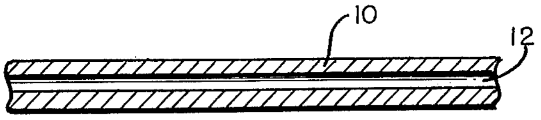
FIG. 4 is a perspective view of a single channel for electron beam spot formation.

Quite often within the context of this invention a single channel is required, particularly for electron microscope scanning purposes or for development of a small and precise electron spot, or the simple amplification of current on a very small scale. It has been found that within the context of the compositions which have been defined in this specification, single channels, e.g. as shown in FIG. 4, may be made from these materials by extrusion techniques.

As a result of the devices, procedures, compositions, techniques, etc., which have been defined above, amplifications ratios for both light and current in excess of a level of 10,000 per stage have been achieved.

The manner in which the desired resistivity range for the barium titanate channel device is obtained gives two different types of results indicating that the best results are achieved when the solid state component exhibits rectifier or diode characteristics. For example, if the channel amplifier is produced as described in this specification, namely, by a full reduction followed by careful oxidation to the desired volume resistivity, a highly efficient channel multiplier with low noise value is obtained. If, however, the channel is first available in a fully oxidized state, i.e. exhibiting a resistivity in excess of $10^{13}$ ohm-centimeters or more and then is brought back to a proper resistivity by reduction without subsequent flash reoxidation of the surface, the amplifying value is markedly reduced and the channel is noisy. More careful investigation of this point has established that in the preferred case a surface rectifying characteristic exists with front-back current ratios of at least 100, in some cases as great as 1000, and in the absence of such rectifying characteristic amplifying performance decreases and noise levels increase. From this evidence, the indications are that the presence of the very thin insulating layer on the surface leading to rectification provides a type of surface which greatly reduces shot noise or other sources of electrons which may contribute to noise, in view of the difficulties of electrons moving improperly through the insulating layer. In the absence of such insulating layer Johnson and shot noise types of electron are able to provide the empty contribution of the electron beam current which ends up as noise.

A summary of the more useful compositions and the preferred temperatures of high temperature heat treatment is given in Tables 1 and 2 following:

Table 1

AMPLIFICATION FACTOR AVAILABLE (SINGLE STAGE) FROM SPECIFIC COMPOSITIONS (ALL IN MOLE PERCENT)

| | A OXIDE | B OXIDE | C OXIDE | D OXIDE | AMPLIFICATION FACTOR |
|---|---|---|---|---|---|
| 1. | Ba O - 50 | Ti $O_2$ - 50 | — | — | 2000 |
| 2. | Ba O - 47.5 | Ti $O_2$ - 47.5 | (2.5 $Ta_2O_5$<br>(2.5 Si $O_2$ | — | 8000 |
| 3. | Ba O - 47.5 | Ti $O_2$ - 47.5 | (2.5 $Ta_2O_5$<br>(2.4 Si $O_2$ | 0.1 $Ag_2O$ | 14000 |
| 4. | Ba O - 40.0<br>$Cs_2O$ - 7.5 | Ti $O_2$ - 47.5 | (1.5 $Ta_2O_5$<br>(3.5 Si $O_2$ | — | 12000 |
| 5. | Sr O - 50 | Ti $O_2$ - 50 | — | — | 900 |
| 6. | Ca O - 50 | Ti $O_2$ - 50 | — | — | 400 |
| 7. | (Ba O - 30<br>(SrO - 17.5 | Ti $O_2$ - 47.5 | (1.0 $Ta_2O_5$<br>(4.0 Si $O_2$ | — | 10000 |
| 8. | (Sr O - 40.0<br>($K_2O$ - 10.0 | Ti $O_2$ - 50.0 | — | — | 4000 |
| 9. | (Ba O - 25.0<br>(Mg O - 5.0<br>($Yt_2O_3$ - 5.0 | (20.0 Ti $O_2$<br>(20.0 Sn $O_2$<br>(10.0 $Nb_2O_5$ | (1.0 $Ta_2O_5$<br>(2.0 Si $O_2$<br>(12.0 $ZrO_2$ | 0.1 $Au_2O$ | 24,000 |
| 10. | (SrO - 30.0<br>($Yt_2O_3$ - 10.0 | ($TiO_2$ - 35<br>($SnO_2$ - 15 | (2.0 $Ta_2O_5$<br>(4.0 Zr $O_2$<br>(4.0 Si $O_2$ | — | 12,000 |
| 11. | (ZnO - 10<br>($La_2O_3$ - 10<br>(CaO - 25 | ($SnO_2$ - 25<br>($Nb_2O_5$ - 25 | (1.5 $Ta_2O_5$<br>(2.0 Zr $O_2$<br>(1.0 Si $O_2$ | 0.5 $WO_3$ | 11,000 |
| 12. | BaO 47.0 | $TiO_2$ - 47.5 | (2.0 $Ta_2O_5$<br>(2.0 Si $O_2$ | 1.5 $Sb_2O_3$ | 9,000 |
| 13. | BaO 30.0<br>$CeO_2$15.0 | $TiO_2$ - 50.0 | (2.0 $Ta_2O_5$<br>(3.0 Si $O_2$ | — | 11,000 |
| 14. | Ba O 15.0 | $TiO_2$ - 75.0 | (2.5 $Ta_2O_5$<br>(2.5 $SiO_2$ | (2.5 $WO_3$<br>(2.5 $Sb_2O_3$ | 4,000 |
| 15. | (SrO - 30<br>(CaO - 10<br>($Cs_2O$ - 5 | $TiO_2$ - 50.0 | (2.0 $Ta_2O_5$<br>(2.5 Si $O_2$ | 0.5 $Ag_2O$ | 18,000 |

TABLE 2

HIGH TEMPERATURE FIRING CONDITIONS FOR COMPOSITIONS GIVEN IN TABLE I

| COMPOSITION | REDUCING FIRING TEMPERATURE | FINAL OXIDATION TEMPERATURE |
|---|---|---|
| 1 | 1420° C | 750° C |
| 2 | 1455° C | 800° C |
| 3 | 1455° C | 800° C |
| 4 | 1400° C | 725° C |
| 5 | 1400° C | 750° C |
| 6 | 1380° C | 750° C |
| 7 | 1440° C | 800° C |
| 8 | 1340° C | 750° C |
| 9 | 1340° C | 720° C |
| 10 | 1420° C | 720° C |
| 11 | 1320° C | 700° C |
| 12 | 1350° C | 825° C |
| 13 | 1400° C | 825° C |
| 14 | 1400° C | 775° C |
| 15 | 1300° C | 750° C |

While the various approaches which have been defined in the foregoing descriptions deal with the question of image and current amplification up to factors of a million or more, in the majority of cases the end result desired is a photographic receptor which takes advantage of these unusual amplification characteristics. In one example of the camera device which utilizes such an image amplification for these purposes a 1000 line per mm hole structure is utilized for the amplification media and the electrons emerging from such a secondary amplifier are forced to strike a phosphorescent surface composed of compounds of zinc, cadmium and combinations thereof suitably doped with copper and silver in accordance with procedures and materials well known in the art. This phosphorescent surface may be deposited as ultra fine particles on a glass or quartz base or may be evaporated on such a base so as to give a continuous grain free structure. The picture taking medium then simply involves applying a photosensitive surface to the out vacuum surface of the glass plate and recording the light images which are thus produced. The arylamine and polyhalomethane compositions described in U.S. Pat. Nos. 3,042, 515–518 and in other pending applications are one means for recording such images. Diazo materials are also suitable and silver halide compositions of high resolution and of low photographic speed can also be utilized. In order to accomplish the proper level of spectral response the phosphorescent or fluorescent material must be so constituted so as to emit light in the desired wavelength again using phosphors and procedures now well known in the art.

An important modification may be utilized. The modification in question comprises two fundamental situations. The first is the preparation of the channel plate such as described previously in which the holes are produced by electro-chemical etching in a fully reduced, electrically conducting semiconductor. After this operation has been completed the channels are then refired in an oxidizing atmosphere at temperatures within 200° C of the original vitrification temperature. Thus in the case of the modified barium titanate compositions the temperature of oxidation is 2400° F roughly equivalent to 1350° C. Under these conditions the fully vitrified body will achieve a light tan color in distinction to the blue black color originally exhibited and the resistivity will be in the range of $10^{12}$ to $10^{14}$ ohm-centimeters. In a hydrogen atmosphere this ceramic is then immersed in a bath of molten type metal at 100° C above its melting point. The hydrogen atmosphere is gradually replaced with argon and finally a vacuum of roughly 20 inches of mercury is imposed. While the argon atmosphere still exists the vacuum is released and while still at the temperature of 100° C above the melting point of the type metal the vacuum is again reimposed. By this double impregnation procedure the holes present in the multichannel ceramic device are completely filled with metal. The type metal has the property of expanding very slightly on cooling so that the cooled article will then hermetically seal each hole with a preformed wire of metal.

After the impregnation is complete the opposing surfaces are mechanically polished and then chemically etched so as to make a clean separation within the conductor and non-conductor portions of the assembly.

This pin type face plate is then made the face of the electronic tube and is hermetically sealed into the envelope which contains the secondary emission electron amplification source. In image intensification, using usch pin type tube a porous web, such as paper, soaked in a suitable electrolyte is placed in direct contact with such face and a counterelectrode made of stainless steel, silver or similarly corrosion resistant material is placed in tight contact with the opposite surface. The counterelectrode is made cathodic and the electrolyte normally contains a water soluble material which, as a consequence of change in pH will change from colorless to deeply colored. Typical of such material is the carbinol base of crystal violet which turns blue on acidification. In order to obtain a picture by utilization of the electron gun containing not only the channel amplifier for amplification of the visual image imposed on the initial photoconductor but also the pin type tube for accepting the responses of the electron output, an image is obtained against the cathodic surface of the electrolyte soaked paper by establishing a potential difference between the exterior face of the electron tube and counterelectrode and this image is the full development of the deep blue crystal violet dye.

A variety of dyes exhibit the same characteristic, particularly those compounds normally utilized as acid-base indicators in analytical chemistry and which experience a marked change in color simply as the result of a change in pH. A suitable electrolyte for the purpose represent dilute solutions of ammonium chloride, sodium chloride and the like which may or may not be modified by the addition of organic salts of alkalis and ammonia for buffer control of pH prior to development.

In order to define more precisely the theory of the action of such channel amplifying structures the following description, representing one presently accepted theory of operation is appended.

A channel amplifying structure in its basic form is shown in FIG. 4, showing a solid material containing a long, thin, cylindrical aperture. A conducting electrode is formed at each end of the solid body forming the channel structure and a D.C. electrical potential is applied between these two electrodes, the input end of the structure being negative with respect to the output end of the channel. In operation, electrons are introduced into the input end of the channel. These electrons are accelerated by potential $V_1$ so that upon striking the wall of the channel the electrons possesses sufficient energy to knock out two electrons from the channel wall. Under this condition the secondary electron multiplication of this channel wall is equal to two, since one incident electron generates two secondary electrons. An axial electric field is supplied by an external source of potential. As a result the two electrons knocked out from the channel wall are accelerated along the channel picking up velocity in their axial movement. Since these electrons are, in general, ejected from the surface in a direction normal to the surface, some small time interval after being ejected they strike at the wall of the channel again. These electrons now have a high energy and they each generate two additional electrons. This process continues until finally the electrons are emitted from the exit end of the channel and are collected. The number of stages in a channel refers to the average number of times the electron stream hits the channel wall in traversing the channel length. A typical channel material might possess a secondary emission ratio between 2 and 3 and involve 5 to 10 stages; hence, gains in the region of 1,000 are easily obtained.

By techniques known to those skilled in the art this image intensifier device can be utilized as a full image retrieval system for producing permanent records on a photographic surface from low light levels. The output making it possible to expose the photographic plate would be in certain instances, a phosphor surface which emits light of a suitable wavelength as a consequence of being struck by high speed electrons but the electrons themselves may be utilized directly for the exposure of a suitably designed photographic film, or a pin type conducting surface may be utilized directly for the exposure of a suitably designed photographic film or a pin type conducting surface may be utilized for the formation of photographic images by electrolysis.

Other areas of utility are electronic display panels where large size panels consisting of arrays of several million channels are utilized in conjunction with either a photoemitter or a scanning electron beam. The output again is a phosphor screen which is viewed directly. Such an electronic display has application in military installations for displaying combat information and for the visual recording of data handling and computer devices.

A single channel may be used as a point source electron gun cathode which provides the means for producing an electron or light spot of exceptionally small and well defined diameter. Under the conditions defined in this invention high electron current densities may be obtained from the well defined small aperature. The input to this cathode may consist either of a low current density thermionic emitter, a photoemitter utilized in conjunction with an appropriate light source, or a gas discharge near the input to the channel. The gas discharge is especially useful in applications involving kinetically pumped systems such as electron microscopes and electron beam processing machines. The gas forming the gas discharge is prevented from escaping rapidly into the vacuum system because of the low conductance of the channel itself.

Because of the inherent high amplification of input currents, the continuous channel photomultiplier may be utilized to multiply the current passing between the control grid and plate of a typical electron tube. By multiplying this current several hundred times, it is possible to raise the vacuum tube transconductance several hundred times.

The channel amplifier may also be used as a microwave oscillator and as an amplifier. Here the channel serves primarily as a wave guide mounted either in the wave guide itself or in a resonant cavity. The bunching effects together with the controlled feedback techniques provide the oscillation of amplification in a manner similar to that presently employed by Klystron tubes.

Miscellaneous applications for these novel devices include replacing conventional photomultipliers, acting as electron multipliers for the output of electron scanning miscroscopes, memory storage devices, and specialized alpha numberical display tubes.

I claim:

1. A fully virified ceramic element comprising a thin wafer having at least one aperture extending through said wafer, and perpendicular to the major surfaces of said wafer, the composition of said wafer consisting essentially of between 10 and 50 mole percent of at least one oxide selected from the group consisting of the oxides of Cs, Rb, K, Be, Mg, Ca, Ba, Sr, Ce, La, Yt and Zn, and between 90 and 40 mole percent of oxide of a metal selected from the group consisting of titanium, tin and niobium and between 0.5 and 3 mole percent of an oxide forming compound of at least one element selected from the group consisting of Ag, Au, Pd, Mo, W, and Sb.

2. The ceramic element of claim 1 wherein the number of apertures is such that they occupy at least 50% of the surface area of said wafer.

3. The ceramic element of claim 1 wherein the thickness of the wafer is between 50 and 150 times the diameter of said apertures.

4. The ceramic element of claim 1 as a face plate in an evacuated envelope.

5. The ceramic element of claim 1 wherein each aperture extending through said wafer is filled with a metal which expands on cooling.

6. An image intensifier tube in which the plate of claim 5 is the face plate.

* * * * *